(12) United States Patent
Rajakumar et al.

(10) Patent No.: US 6,770,255 B1
(45) Date of Patent: Aug. 3, 2004

(54) PROCESS FOR CHLORINE RECOVERY

(75) Inventors: Viruthiamparambath Rajakumar, Clayton (AU); Damien Bowyer O'Connell Harding, Clayton (AU)

(73) Assignee: The Commonwealth of Australia Commonwealth Scientific and Industrial Research Organization, Campbell (AU)

( * ) Notice: Subject to any disclaimer, the term of this patent is extended or adjusted under 35 U.S.C. 154(b) by 0 days.

(21) Appl. No.: 09/720,098

(22) PCT Filed: Jul. 7, 1999

(86) PCT No.: PCT/AU99/00546
§ 371 (c)(1),
(2), (4) Date: Feb. 23, 2001

(87) PCT Pub. No.: WO00/02813

PCT Pub. Date: Jan. 20, 2000

(30) Foreign Application Priority Data

Jul. 7, 1998 (AU) ............................................. PP4550

(51) Int. Cl.[7] ........................... C01B 7/03; C01G 49/06; C22B 34/12
(52) U.S. Cl. ....................... 423/500; 423/502; 423/504; 423/492; 423/493; 423/148
(58) Field of Search ................................ 422/139, 202, 422/146, 109, 147; 423/502, 148, 138, 633, 492, 493, 500, 504

(56) References Cited

U.S. PATENT DOCUMENTS

| | | | |
|---|---|---|---|
| 3,050,365 A | | 8/1962 | Nelson |
| 3,092,456 A | | 6/1963 | Nelson |
| 3,642,441 A | | 2/1972 | Van Weert |
| 3,779,181 A | * | 12/1973 | Staffin et al. ............... 110/228 |
| 3,793,444 A | | 2/1974 | Reeves |
| 3,944,647 A | | 3/1976 | Bonsack |
| 4,060,584 A | | 11/1977 | Hartmann et al. |
| 4,073,874 A | | 2/1978 | Fukushima |
| 4,140,746 A | | 2/1979 | Turner |
| 4,144,316 A | | 3/1979 | Haack et al. |
| 4,329,526 A | * | 5/1982 | Bagley et al. .............. 570/203 |
| 4,624,843 A | | 11/1986 | Robinson |
| 4,994,255 A | | 2/1991 | Hsu |
| 5,707,919 A | * | 1/1998 | Miyata et al. .............. 502/319 |

FOREIGN PATENT DOCUMENTS

| | | |
|---|---|---|
| AU | 30628/77 | 5/1979 |
| AU | 46786/79 | 11/1979 |

OTHER PUBLICATIONS

Richard S. Olsen, Recovery of Chlorine from Ferric Chlorine, pp. 771–783, International Symposium on Recycle and Secondary Recovery of Metals (1985) (no month).
Fukushima, Mistsubishi Process for Upgrading Ilmenite and Chlorine Recirculation, pp. 443–467 (no date).

* cited by examiner

Primary Examiner—Ngoc-Yen Nguyen
(74) Attorney, Agent, or Firm—Merchant & Gould, P.C.

(57) ABSTRACT

The specification discloses a process for recovering chlorine from a chlorinator waste. The process involves treating the chlorinator waste with oxygen in a fluidised bed under conditions which promote the conversion of metal chlorides to metal oxides and discourage the oxidation of carbon contained in the waste. Suitable conditions include a bed temperature in a range from 400 to 700° C., a superficial velocity in a range from 0.2 to 1 metre/second and stoichiometric ratio, R, in a range from 0.2 to 1.2.

7 Claims, 6 Drawing Sheets

PROCESS FOR CHLORINE RECOVERY

The present invention is concerned with a process for the recovery of chlorine from metal chlorides. More specifically, the invention relates to a process for dechlorinating iron chloride mixed with several other metal chlorides to produce chlorine gas. The process has the ability to recover chlorine from these chlorides in the presence of carbon and other materials such as oxides which are present in typical wastes generated during the chlorination of synthetic rutile.

Titanium tetrachloride is conventionally produced from either ilmenite or rutile (including synthetic rutile) in a fluidised bed at around 1000° C. Chlorine, a carbon rich material such as petroleum coke and a titanium-bearing material are fed into the fluidised bed chlorinator and titanium tetrachloride vapour leaves the system in the gas phase. It is subsequently condensed, purified and used in the production of either pigment or titanium metal. Chlorine is recycled to the chlorinator.

Impurities such as Mg, Mn, Al in the feed are chlorinated to varying degrees. Iron in the feed chlorinates readily and is sufficiently volatile to leave the reactor with the effluent gas. The chlorides of these metals are condensed from the gas phase at temperatures around 200° C., while titanium tetrachloride, which has a lower boiling point, remains as a vapour. Non titanium metal chlorides are therefore amenable to separation by differential condensation. They are recovered as solids in the chlorinator off gas cooling system.

The condensed stream from the chlorinator typically contains chlorides such as $FeCl_2$, $MnCl_2$, $MgCl_2$ and $AlOCl$, as well as large quantities of coke and synthetic rutile which are blown over from the chlorinator. This material is referred to as the chlorinator waste.

The chlorinator waste is subsequently disposed of by whatever means are most acceptable from an environmental point of view. Techniques include direct dumping in mineshafts, blending into concrete for low-strength marine applications and wet chemical treatment to produce iron oxide and HCl (or NaCl with usage of caustic soda). In some pigment plants the waste is currently disposed of by mixing it with CaO and water which react with the chlorides to form oxides and $CaCl_2$. The oxides and other solids are thickened, de-watered and returned to the mine. The $CaCl_2$ liquor is discharged into the ocean.

These forms of disposal mean that valuable chlorine present as chlorides in the chlorinator waste is not recovered. These options are also undesirable because they are either environmentally sensitive or costly in terms of consumables and generally call for minimisation of iron chloride production. For this reason, rutile is the feedstock of choice for chlorination. It contains less iron than ilmenite. In commercial processes, therefore, ilmenite is first converted to synthetic Futile by removing substantially all of the iron by appropriate pre-treatment processes and the synthetic rutile is subsequently used in the chlorination process.

An alternative to simply disposing of the chlorinator waste is to react the waste directly with oxygen to form oxides and recover the chlorine as shown schematically in FIG. 1. The oxides generated could be useful as landfill or smelter feed, or returned to the mine and the chlorine recycled to the chlorinator. Such a dechlorination process has the potential to reduce the cost of pigment production by reducing the quantity of fresh chlorine required, and by significantly reducing the consumption of water.

The chlorination industry has a long-standing need for a process which can convert iron chloride into chlorine and iron oxide. In the production of titanium tetrachloride the chlorine could be directly recycled to the chlorinator, thereby decreasing the need for chlorine-make-up. For such a process to be effective, the iron oxide produced would need to be sufficiently free of chlorine to allow disposal as landfill or smelter feed with little or no further treatment. The availability of such a process would create the potential for processes such as:

Direct chlorination of ilmenite in the case of "clean" (low Ca, Mg, Mn, Al) deposits. This simultaneously obviates the need for synthetic rutile production and offers a solution to the iron chloride disposal problem.

Ilmenite conversion to synthetic rutile by partial chlorination with subsequent alkali removal in the case of dirty (high Ca, Mg and/or Mn) deposits. This would present an alternative to more conventional methods of impurity removal by reduction and leaching and would lead to reduced waste disposal requirements.

A general waste disposal route for undesired iron chloride and other chlorides which yields chlorine for direct recycle to chlorination systems. This includes the use of skid mounted plants to process accumulated iron chloride waste at existing chlorinator sites, particularly in Europe and USA.

PRIOR ART

The proposed technologies for chlorine recovery, as disclosed in the literature, are not sufficiently selective and/or have unattractive scale-up features.

The Du Pont recirculating fluidised bed approach (U.S. Pat. Nos. 3,793,444, 4,144,316 and 4,174,381) claims greater than 95% chlorine removal, leaving a nominal 3–5% leachable chloride in the solid phase and rendering it unsuitable for direct disposal.

The Mitsubishi vapour-phase approach (S Fukushima and Y. Sugawara, Light metals, AIME 1974), claims 90% chlorine removal and in addition, has perceived scale-up limitations.

The Mineral Process approach (U.S. Pat. No. 4,140,746) comprises partial dechlorination of ferric chloride to ferrous chloride in the presence of a reducing agent such as sulfur or chlorine polysulfides to produce a chloride compound in the first step. In the second step the ferrous chloride is oxidised to ferric chloride and ferric oxide and the ferric chloride is recycled to the first step. The chlorine values were recovered as compounds containing chlorine but not as chlorine gas.

SCM Chemical's U.S. Pat. No. 4,624,843 (inventor M Robinson, 25 Nov. 1986) refers to control of the proportions of the iron chloride and carbon in the blown over material from the chlorinator by controlling the iron oxide concentration in the feed to the chlorinator. The iron oxide is claimed to be introduced through the addition of ilmenite and/or rutile slag. The chlorinator is therefore being used as a selective chlorinator or beneficiator to upgrade other Ti bearing materials. The blown over carbon is controlled between 7.5 and 20% carbon based on the carbon plus iron chloride only, the blow over of rutile is not specifically mentioned. It is claimed that the iron chloride is formed as ferric chloride under the conditions used in the selective chlorinator.

The dechlorinator claimed in U.S. Pat. No. 4,624,843 is based on the introduction of more than one oxygen stream into the reactor. A first stream introduced at the base of the fluidised bed is intended to react with the carbon content of the feed and maintain the bed temperature at between 500 and 1050° C., "preferably at least at 600° C.". This step seems to be intended to vaporise the ferric chloride although the patent is not very clear on this aspect. A second or more oxygen streams, which appear to need preheating, are introduced above the bed to react with the ferric chloride vapour.

With the dechlorination reaction occurring in the gas phase above the bed between ferric chloride vapour and oxygen, the conversions are unlikely to be complete because of residence time constraints. This implies that iron chloride recycle levels will be significant. Moreover, the iron oxide will be produced as fine dust which increase the probability of accretion formation at the bed exit.

We have discovered that waste obtained from typical chlorinators a) the iron is present as ferrous chloride, b) the conversion of ferrous to ferric chloride is reasonably rapid during dechlorination and c) the conversion of chloride to oxide is helped by using a fluidised bed of particles. The need for the type of pseudo multi-stage operation claimed in U.S. Pat. No. 4,624,843 makes reactor operation and control more difficult with no perceived gain.

SCM Chemicals' U.S. Pat. No. 4,994,255 (inventor C K Hahn, 19 Feb. 1991) is a process patent which claims several hypothetical process schemes in which a major feature is the claim to apparent complete or near complete separation of carbon from the rest of the blown over material. It is claimed that "the carbon and ore solids can be most efficiently removed by using a ceramic filter bag in a baghouse. The temperature can be as high as 800° C." However, the patent goes on to state that the "carbon content in the condensed $FeCl_2$ under these conditions is below about 12% and usually, the removal of carbon and ore is almost complete". The patent also refers to U.S. Pat. No. 4,094,954 and states that "the carbon, together with any ore in the offgas stream can be separated by conventional means such as using a hot cyclone separator, electrostatic separator or a knock-out pot. Their claim implies, erroneously, that at 800° C. the ferrous chloride is in vapour form.

The conceptual flowsheets in FIGS. 1, 2, 4 and 5 in U.S. Pat. No. 4,994,255 are not substantiated by any results. It is clear from the descriptions and diagrams that the patent assumes that substantially pure $FeCl_2$ is treated in the $FeCl_2$ oxidiser. The $FeCl_2$ oxidiser appears to be based on an inert material which is partly removed with the iron oxide coating. Because their patent is based on pure or substantially pure iron chloride, an inert bed is necessary to avoid potential problems due to molten chlorides.

U.S. Pat. No. 4,994,255 does not reveal the optimum operating conditions such as temperature and oxygen/waste feed ratio for maximum chlorine recovery at economic rates of chlorine production other than to say that the temperature should be below the melting point of $FeCl_2$ (674° C.).

We have discovered that in a real chlorinator waste the conversion rates of the chlorides can be quite rapid despite the presence of liquid phases which melt at much lower temperatures when other metal chlorides such as those of Mn and Mg are present along with iron chloride. Our invention is not limited to pure iron chloride.

U.S. Pat. No. 4,144,316 for ferric chloride conversion claims the need to add a catalyst (sodium chloride) to achieve satisfactory conversion in a fluidised bed of ferric chloride particles. U.S. Pat. No. 3,944,647, restricted to the treatment of ferric chloride, also claims the use of sodium chloride to produce a liquid sodium ferric chloride salt complex.

Various publications have dealt with the problems of obtaining high conversions with ferric chloride. A paper by Olsen (Olsen R S, in Recycle and Secondary recovery of metals, 1985, Taylor P R et al editors, pp771–783) gives results of a preliminary study of the treatment of ferrous chloride in a fluidised bed but the reported conversions were low. We have discovered that in a real chlorinator waste, the conversion rate and final conversion of the chlorides in the waste are high without the need for any catalyst addition.

U.S. Pat. No. 3,642,441 (Falconbridge Nickel Mines) appears to be based on a complex process with a multiplicity of streams and relies on the endothermic reaction of "explosive" mixtures of metal chlorides with water and combustion of the mixtures. Significant quantities of hydrogen bearing gases will result and even if the process were capable of being scaled up satisfactorily, it is likely to be more suited to HCl rather than chlorine production.

U.S. Pat. No. 3,325,252, and related U.S. Pat. No. 3,050,365, are based on a two-zone furnace using molten iron chloride feed. Based on the quoted example, liquid ferric chloride is fed under pressure through a spray head to the inner tube of a burner with oxygen supply through an outer tube. It is claimed that the reaction is completed in a second, lower zone, into which alumina particles are fed. This zone was maintained at about 450° C. but the rate of chlorine recovery would have been low under these conditions. The process seems to be restricted to iron chloride levels less than 10% in the feed. Higher ferrous chloride levels are unlikely to give satisfactory chlorine recoveries because of short residence times and the absence of inert substrate particles in the upper zone and the slow kinetics in the lower zone. Accretion formation is also seen as a major problem. U.S. Pat. No. 3,092,456 attempts to address this issue but a practical solution is not simple.

The vapour phase contacting method claimed by Mitsubishi (U.S. Pat. No. 4,073,874 to Fukushima et al) is based on treating ferric chloride. The ferric chloride vapour and several streams of oxygen, injected through nozzles, react with each other in an enclosure. It is claimed that in initial work there were significant operational problems caused by the formation of iron oxide accretions at the point where the chloride vapour stream impinged on the oxygen stream. It appears that the problem (Fukushima S and Sugawara Y in Light Metals Technology II, 1974, pp443–466) with accretions was not completely eliminated.

In summary, the application of fluidised bed or other (mainly vapour phase contacting with oxygen) technologies to the recovery of chlorine from iron chloride has been the subject of a few patents and literature but these claimed processes have severe limitations that have apparently hindered successful commercial implementation.

Processes based on direct gas phase contacting between iron chloride vapour and oxygen in the absence of a bed of inert material have significant problems due to accretion formation resulting from the production of fine dust of iron oxide.

Beneficiation/partial chlorination in which iron units are added through ilmenite or rutile based slag to control the carbon/chloride ratio in the waste is impractical because control of the waste composition to optimise the dechlorination unit cannot be achieved as indicated in U.S. Pat. No. 4,624,843.

Pre-oxidation of the waste to 500–800° C. (U.S. Pat. No. 4,060,584) to apparently convert the ferrous chloride to ferric chloride vapour and iron oxide, the ferric chloride vapour being separated from the iron oxide using high temperature separation and subsequently dechlorinating the iron chloride vapour in a multi stage process will not recover the significant amount of chlorine associated with the other metals which will stay with the solids in the pre-oxidiser.

It is also important to note that the patents ignore the fact that the chlorine associated with iron is only a proportion of the total chlorine available for recovery and the chlorine associated with the other elements such as Mn, Mg and Al and other elements need to be recovered.

We note that carbon and ore blow through occurs routinely in synthetic rutile chlorination plants and recognise that it is difficult to eliminate such blow through and/or implement cost-effective technology for separating the carbon and ore from the chlorides at the exit of the chlorinator. We have also discovered that the major amount of chloride collected in the blown over material is coated on the larger carbon and rutile particles with a minor amount as free chlorides. It is therefore important to recover the chlorine from the chloride coated on the particles and it is not sufficient to remove the carbon and rutile particles by filtration or other means as has been proposed in some of the prior art discussed above.

According to a first aspect of the present invention there is provided a process for recovering chlorine from chlorinator waste including the steps of forming a fluidised bed of chlorinator waste in a fluidising gas containing oxygen and treating the chlorinator waste with oxygen under conditions which promote conversion of metal chlorides into metal oxides and discourage oxidation of carbon contained in the waste.

Preferably the process further includes the steps of separately recovering metal oxides and chlorine gas. Typically the chlorine gas is recycled into the chlorinator in a process for the production of titanium tetrachloride from ilmenite or rutile, including synthetic rutile.

Typically the chlorinator waste contains chlorides such as $FeCl_2$, $MnCl_2$, $MgCl_2$, $AlOCl$, as well as large quantities of coke and feed material such as synthetic rutile which are blown over from the chlorinator in a process for production of titanium tetrachloride. Accordingly, in a preferred embodiment of the invention the dechlorination of the chloride is achieved by controlling superficial velocity of the fluidising gas in the fluidised bed, the proportion of oxygen in the gas fed to the fluidised bed, the oxygen to chlorinator waste feed ratio and the temperature within the fluidised bed, either separately or in combination, so as to maximize the recovery of chlorine gas and/or minimize the conversion of carbon. Under these conditions the dechlorination process strips chloride absorbed to particulate matter in the feed, such as carbon and rutile particles, and from separate chloride particles in the feed.

Preferably the temperature in the fluidised bed is in the range of 400 to 700° C., the superficial velocity of the gas is in the range of 0.2 to 1.0 m/s and the oxygen to chlorinator waste stoichiometric ratio, R, is in, the range 0.2 to 1.2. The stoichiometric ratio, R, is the ratio of oxygen supplied to the stoichiometric oxygen required to completely convert the chlorides and carbon to obtain chlorine and carbon dioxide respectively. Typically the temperature in the fluidised bed reactor, the superficial velocity of the gas and the oxygen to waste molar ratio can be selected depending an the composition and morphological characteristics of the chlorides and other particles, including the particle size of the particles, in the chlorinator waste.

According to a second aspect of the present invention there is provided an apparatus for recovering chlorine from chlorinator waste, which apparatus includes fluidised bed reactor, means for introducing chlorinator waste into the fluidised bed reactor, means for introducing a fluidising gas containing oxygen into the fluidised bed reactor and means for controlling oxygen to chlorinator waste molar feed ratio, superficial velocity of fluidising gas and temperature within the fluidised bed reactor.

The fluidised bed reactor may have a conical bottom entry region for the chlorinator waste feed material and fluidising gas Alternatively, the fluidising gas may be fed into the fluidised bed reactor through a distributor plate. The reactor, is appropriately cooled or heated to allow the extraction or addition of heat to the process depending on the energy requirement of the process, which can be calculated based on the waste composition and the operating parameters.

According to a third aspect of the present invention there is provided a system for recovering chlorine from chlorinator waste including the apparatus described above, and further including means for collecting particulate matter which leaves the fluidised bed reactor and means for quenching any unreacted chlorinated compounds, particulates and the chlorine gas stream which leave the fluidised bed reactor.

Typically the means for collecting particulate matter is a cyclone and the means for quenching unreacted chlorinated compounds is a quencher downstream of the cyclone. In this arrangement solid materials are collected in the cyclone and the resultant gas stream passed through the quencher. The quencher is arranged so that condensable vapors are removed by quenching and the cooled chlorine gas stream that results is conveyed to a baghouse or other appropriate separation device to remove any residual fine dust particles so as to obtain a clean chlorine gas stream. The chlorine gas stream can be directed to a chlorinator in a titanium tetrachloride production process.

Preferably the cyclone is maintained at a temperature above the condensation temperature of any unreacted chlorinated compounds so that an effective separation is achieved between the solids and the unreacted chlorinated compounds. Typically the conditions in the cyclone, including the residence time of the particles and the temperature in the cyclone are chosen so as to avoid oxidation of carbon in the cyclone.

According to a fourth aspect of the present invention there is provided a process for the dechlorination of metal chlorides in a mixture including at least one metal chloride and also including carbon, or carbon-containing materials, and other materials such as, but not limited to, metal oxides, the process including forming a fluidised bed of the mixture in a fluidising gas containing oxygen and converting the mixture under conditions which promote conversion of metal chlorides to metal oxides and discourage oxidation of carbon.

Typically the mixture contains ferrous and/or ferric chloride and chlorides such as those of manganese, magnesium, calcium and aluminium. The mixture may also include metal chlorides such as those of V, Cr, Mb, Zr, Na, Ba, Ce, Sr, Si, Be or Cu.

Preferred embodiments of the present invention will be described, by way of example only, with reference to the accompanying figures, in which.

Figure 1:
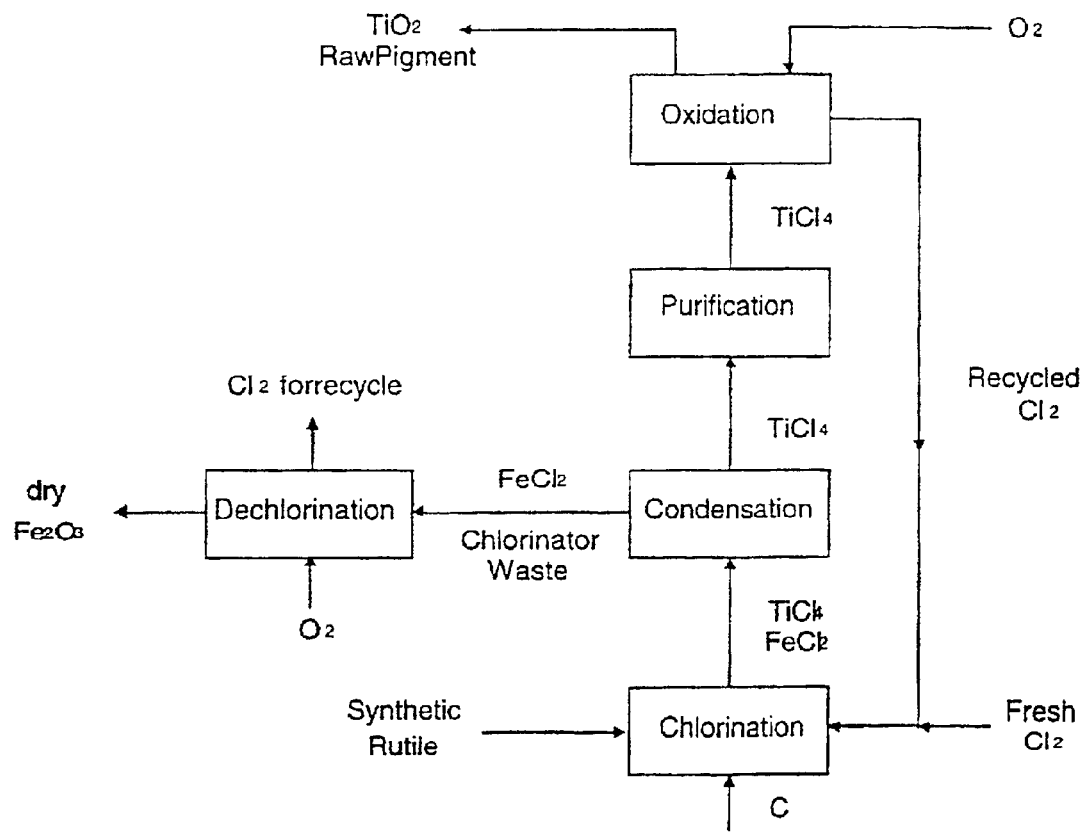
FIG. 1 is a flow chart illustrating the general process for preparation of titanium dioxide pigment from synthetic rutile, including treatment of the chlorinator waste.
Figure 2:
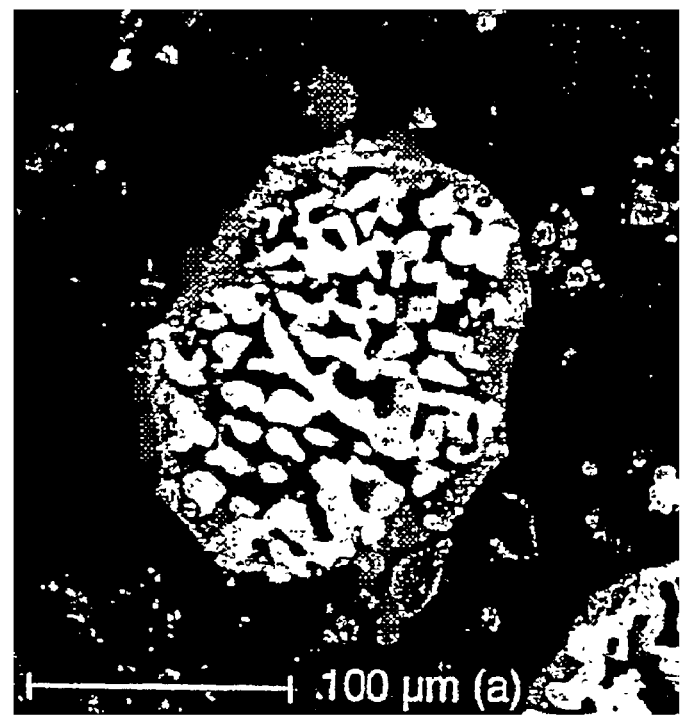
FIG. 2 shows a back scatter electron image of (a)a synthetic rutile particle and (b) a carbon particle typical of those present in a sample of blown over material from an operating chlorinator in the process schematically illustrated in FIG. 1.
Figure 2:
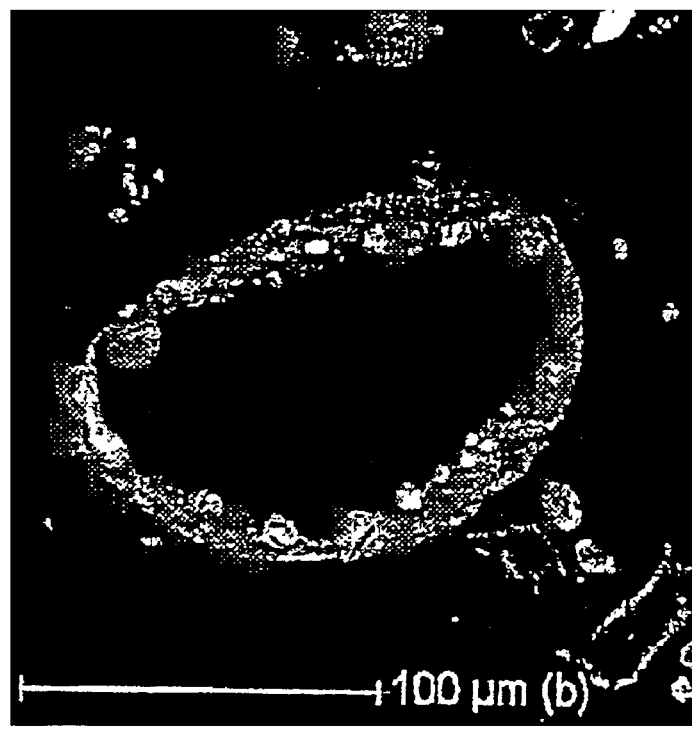

By way of explanation of the invention we illustrate in FIG. 2 typical back scatter electron images of (a) a synthetic rutile particle and (b) a carbon particle typical of those present in a sample of blown over material from an operating chlorinator. The images show that the condensed chlorides were present as a coating, about 10 μm thick on the surface and in the external pores of the particles. Both images also show small, separate agglomerates 1 to 10 μm of chlorides. Based on examination of the sample under the SEM and microprobe, it appears that about half of the condensed chlorides was present on the particles and the other as agglomerates. It is clear from the nature of the coating on the surface of the rutile and coke particles that the particles cannot be easily separated from the chlorides and returned to the chlorinator.

It is important to note that typical samples contained a large number of elements in a significant quantities, as chlorides and oxides. Typical concentrations of various species are given in Table 1. For this waste, the stoichiometric oxygen required to completely convert the chlorides and carbon to obtain chlorine and carbon dioxide respectively is about 76 moles of oxygen per 100 moles of waste.

It is noteworthy that the composition of typical waste from a chlorinator is quite different from the simple iron chloride material considered in the prior art. It is also noteworthy that typical waste does not contain any significant quantity of ferric chloride. The major chloride bearing species is ferrous chloride. The large number of chloride and oxide species is particularly noteworthy. The sample also contains a significant amount of carbon, about 23% carbon in the example in Table 1. Prior art does not reveal the conditions required to maximize chlorine recovery and minimize carbon combustion from this type of complex material to obtain chlorine gas with practically relevant concentrations.

Figure 3:
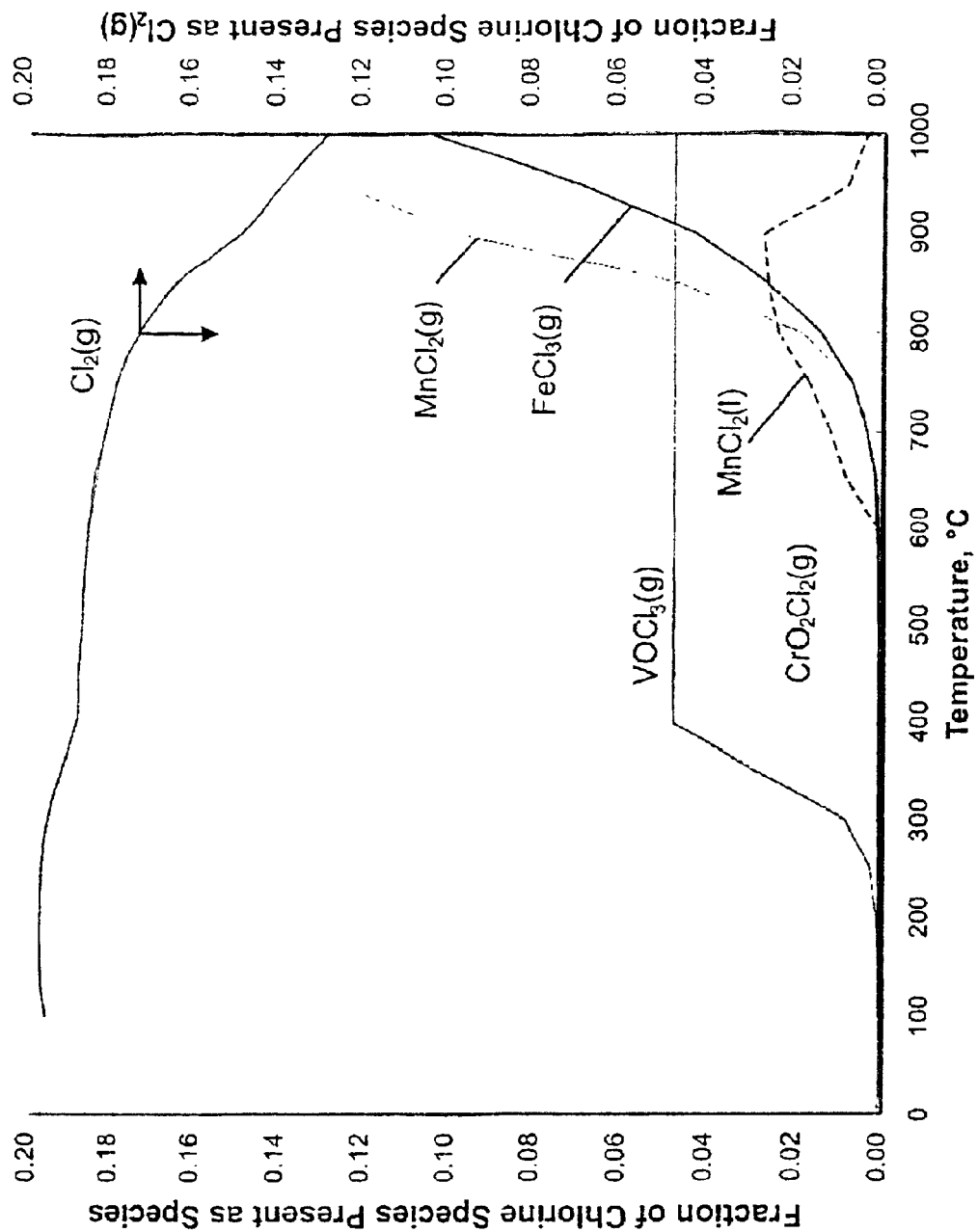
FIG. 3 is a graph of fraction of chlorine present as certain chosen species verses temperature for a thermodynamic simulation of the effect of temperature on the distribution of Cl between species at 96 moles of oxygen per 100 moles of chlorinator waste. The fraction of Cl associated with the species is graphed on the primary Y axis and the fraction of $Cl_2$ gas recovery on the secondary X axis.

By way of the basis for our process we illustrate in FIG. 3 the thermodynamic simulation of the results of dechlorination showing the effects of temperature at 96 moles of oxygen per 100 moles of waste. Increasing the temperature decreases the recovery of chlorine due to the increased stability of the chlorides at the higher temperature. At temperatures below 150° C., the only chlorides that do not release chlorine are those of Ba, Na and Nb. At 150° C. oxides of vanadium and chromium form. As the temperature increases, the oxychlorides of these metals form, and chlorine recovery is complete from the vanadium and chromium compounds at 400 and 700° C. respectively. At 650° C., $MnCl_2$ forms a liquid at the expense of $Mn_2O_3$. As the temperature increases to 1000° C., ferric chloride, and manganese chloride increase at the expense of oxides. From 100 to 1000° C., chlorine is completely removed from chlorides of Al, Mg and Ti and not removed from chlorides of Na and Nb.

TABLE 1

Composition of a chlorinator waste

| Species | Concentration (wt %) |
| --- | --- |
| $FeCl_2$ | 12.4 |
| AlOCl | 3.8 |
| $MnCl_2$ | 3.9 |
| $MgCl_2$ | 2.2 |
| $TiCl_4$ | 0.35 |
| V,Cr,Ca, Nb,Zr, Na, Ba, Ce, Sr, Si, Be, Cu chlorides | 1.6 |
| $TiO_2$ | 46.1 |
| $SiO_2$ | 2.1 |
| Oxides of Nb,Al,Cr, V,Zr,Cu, Fe,Ce,Ba, Mg,Mn,Ca,Be,Sr,Na | 3.2 |
| Carbon | 23.2 |
| Sulphur | 1.1 |

With increase in temperature the overall equilibrium conversion to chlorine gas decreases but the rates of the various dechlorination reactions increase. These results and our observations show that at higher temperatures where the dechlorination kinetics of ferric chloride are acceptable, a proportion of the iron chloride and manganese chloride remain unreacted and the overall chlorine recovery drops significantly with increase in temperature above about 750° C.

Figure 4:
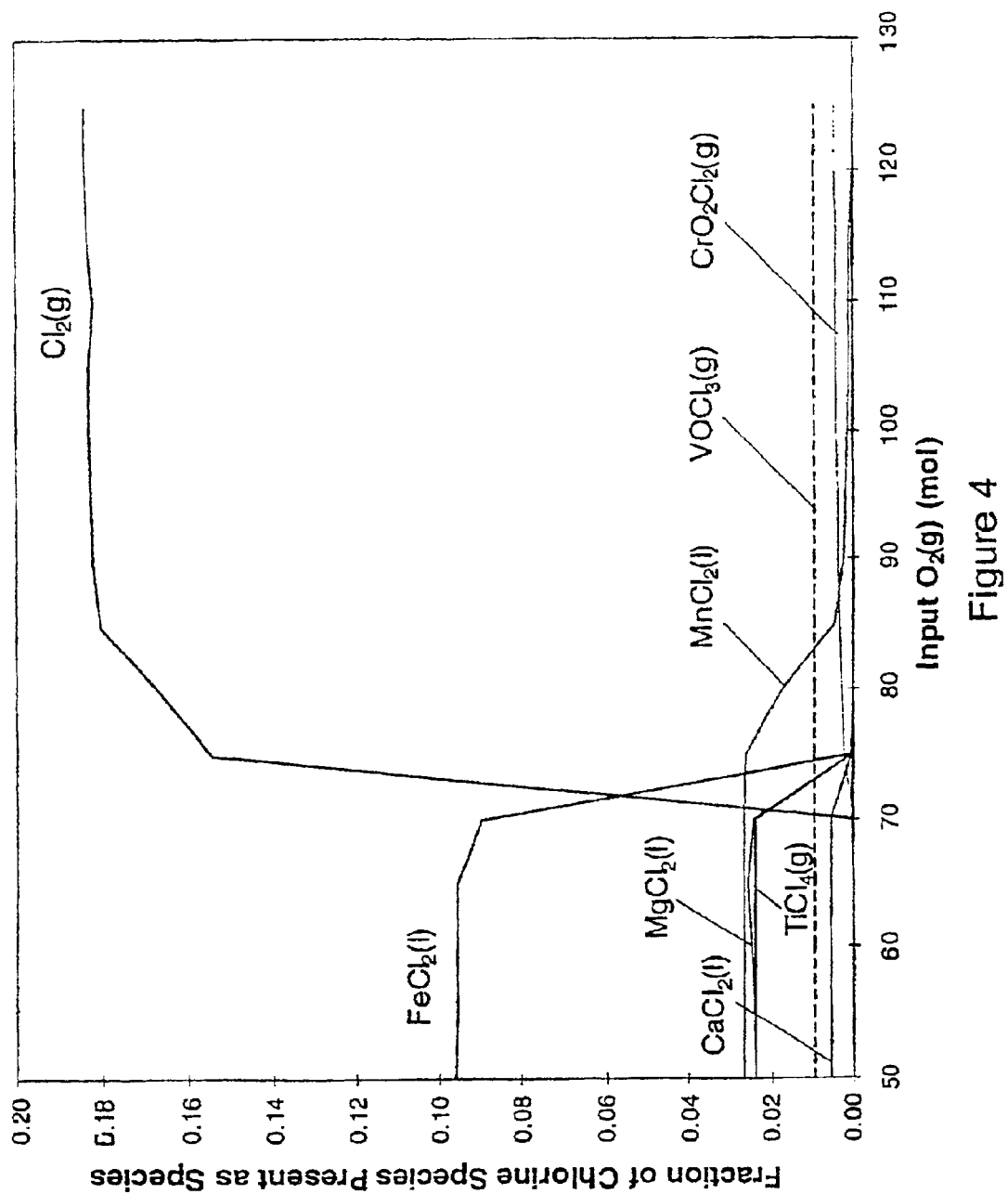
FIG. 4 is a graph of the fraction of Cl present as certain species verses the input of oxygen gas in a thermodynamic simulation of the effect of $O_2$ on the distribution of Cl between species at 650° C.

FIG. 4 shows that at a constant temperature of 650° C., increasing the quantity of oxygen increases the recovery of chlorine when thermodynamic equilibrium prevails. Below about 70 moles of oxygen per 100 moles of waste, most of the chlorides remain unreacted due to the preferential consumption of oxygen for the oxidation of carbon. It is clear that above about 85 moles of oxygen per 100 moles of waste, there is no significant increase in the recovery of chlorine.

Results typically as illustrated above clearly show that it is necessary to maximize the recovery of chlorine while minimising the combustion of carbon in order to obtain a chlorine-rich gas and minimize the oxygen consumption.

We have discovered that the carbon combustion can be significantly reduced by the appropriate selection of temperature, gas superficial velocity in the dechlorination reactor and the stoichiometric ratio, R.

Figure 5:
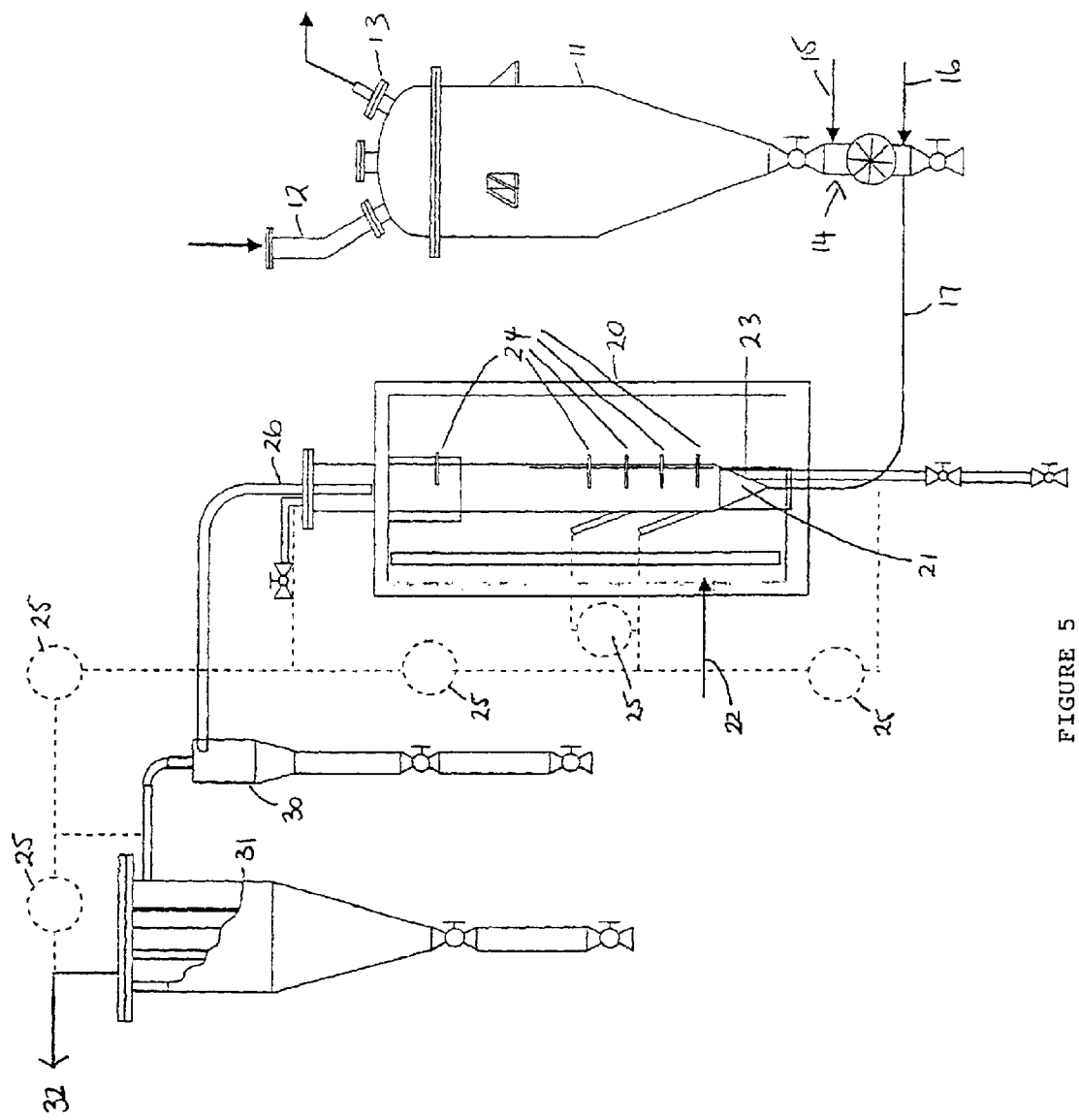
FIG. 5 is a schematic diagram of a dechlorination facility capable of use in the present invention.

A dechlorination facility as illustrated schematically in FIG. 5 was used to demonstrate our process. It should be noted that the specific scheme shown in the figure is only indicative of the process used to demonstrate our invention and is not intended to be limiting of the invention in any way, the major purpose of the experimental scheme being the demonstration of the selectivity which was achieved with respect to maximizing chlorine recovery and minimising carbon combustion.

The system used to demonstrate the process comprises a feed hopper 11, an inlet 12 for chlorinator waste and a vent 13. The feed hopper 11 has an outlet 14 which includes an inlet 15 for dry nitrogen and an inlet 16 for oxygen, and hence a mixture of chlorinator waste and a gas containing oxygen is fed along line 17 to the dechlorinator 20. The chlorinator waste 17 is fed into the bottom of the fluidised bed reactor 20 through a conical entry 21 which allows the waste to be injected into the bed in a controlled and reproducible manner. In the experiments conducted the bed material was initially rutile which was gradually replaced by the waste material as the test progressed. The bed height was maintained at a constant value by periodically withdrawing accumulated material from the reactor 20. The reactor 20 includes provision to extract or supply heat, in this case cooling the inlet 22 and water cooled jacket 23, as desired to maintain the temperature of the reactor and the fluidised bed at the selected value. Appropriate temperature measurement devices 24 and pressure measurement devices 25 are included.

The fluidised bed reactor 20 includes an outlet 26 for a chlorine-rich gas stream leaving the reactor. The chlorine-rich gas stream is then treated to remove any contaminants from the chlorine gas, first by being passed through cyclone 30 which separates particulate matter from the gas stream, then through filter 31 which removes further small particles from which gas stream 32 emerges which contains chlorine, carbon dioxide and oxygen. This gas stream could be treated if required to increase the chlorine concentration further. In some tests a quencher (not shown) was used before the filter to quench any unreacted chloride vapors.

With this experimental system we achieved independent and careful control of the temperature of the reaction, the oxygen:waste feed ratio, gas superficial velocity and inlet gas composition in the dechlorinator. Other variations were made in the facility when required for specific tests.

By way of examples of the results that demonstrate our invention, the results of various tests are given below. In each of these tests the waste material containing the chlorides typically as listed in Table 1 was fed into the dechlorinator with oxygen under controlled, steady conditions. The products were analysed and the percent chlorine recovery and carbon conversion (=100× chlorine or carbon transferred to the gas phase/chlorine or carbon in the feed) were determined. The distribution of residual carbon and chlorine among the condensed products and gas were also determined. Typical results which illustrate the effects of various parameters are given in Tables 2–4.

In tests 1 and 2, gas at a superficial velocity of 0.5 m/s, calculated from the flow of oxygen in the reactor at the reaction temperature, and a constant oxygen: feed stoichiometric ratio, R, of approximately 0.78 was used and the effect of varying the temperature is shown in Table 2. We show that the carbon combustion dropped significantly from 58% to 16% when the temperature was reduced from 615 to 600° C. thereby producing a gas much richer in chlorine. The results also show that the chlorine recovery increased significantly with temperature with a recovery of 85% obtained at 615° C.

In tests 3 and 4 the effect of increasing the superficial velocity was investigated at constant temperature and stoichiometric ratio (R=1 plus or minus 0.07). Again we demonstrate in Table 3 that by increasing the superficial velocity the carbon conversion was decreased to as low as 14% thereby allowing a richer chlorine gas to be produced.

TABLE 2

Effect of temperature

|  | Test 1 | Test 2 |
|---|---|---|
| Temperature (° C.) | 615 | 600 |
| Gas superficial velocity (m/s) | 0.5 | 0.5 |
| Stoichiometric ratio | 0.80 | 0.76 |
| Chlorine recovery (%) | 85 | 62 |
| Carbon conversion (%) | 58 | 16 |

TABLE 3

Effect of gas superficial velocity

|  | Test 3 | Test 4 |
|---|---|---|
| Temperature (° C.) | 600 | 600 |
| Superficial velocity (m/s) | 0.7 | 0.3 |
| Stoichiometric ratio | 1.07 | 0.930 |
| Chlorine recovery (%) | 69 | 85 |
| Carbon conversion (%) | 14 | 33 |

As a further illustration of the invention, the results of tests 5 and 4 are compared in Table 4. In this case a constant temperature and superficial velocity were maintained and increasing the stoichiometric ratio increased the chlorine recovery to 85% and reduced the carbon conversion from 36 to 33%, again leading to the production of a richer chlorine gas.

TABLE 4

Effect of stoichiometric ratio, R.

|  | Test 5 | Test 4 |
|---|---|---|
| Temperature (° C.) | 600 | 600 |
| Superficial velocity (m/s) | 0.3 | 0.3 |
| Stoichiometric ratio | 0.53 | 0.93 |
| Chlorine recovery (%) | 55 | 85 |
| Carbon conversion (%) | 36 | 33 |

It should be emphasised that the results in Tables 2–4 are only quoted by way of example to illustrate that the invention gives us the ability to independently control the carbon combustion and chlorine conversion to produce chlorine gas of the desired concentration depending on the application and usage of chlorine.

We have also demonstrated that the invention provides a means for stripping the chloride coating from the carbon particles during their residence in the fluidised bed and that the unreacted carbon blown over and collected in the cyclone is substantially free of chloride. The chlorine from the chloride coating and separate chloride particles react with the oxygen in the gas and chlorine is efficiently separated from the carbon particles.

By way of example, in Test 2, a low carbon conversion of 16% was obtained. Of the unconverted carbon, 88% was collected in the cyclone thereby achieving an efficient separation of the carbon and only a small loss of carbon as carbon dioxide into the gas phase. In Tests 1 and 5, 95% and 89% respectively of the unreacted carbon was collected in the cyclone and confirm that the application of the invention results in good collection efficiencies of the unreacted carbon in the cyclone. These examples are quoted to illustrate the invention and are not intended to be limiting in any way.

A further aspect of our invention is that it also provides a means for increasing the chlorine recovery from the waste by separating the blown over carbon and rutile particles in the cyclone at a temperature above the condensation temperature of any unreacted chloride which avoids the condensation of these chlorides in the cyclone. The temperature of the cyclone will depend on the type of chloride vapors in the exit of the dechlorinator. By maintaining the temperature of the cyclone above the condensation temperature of the vapors, the unreacted vapors are separated from the carbon and rutile particles. For example a temperature of about 350° C. ensures that ferric chloride vapour does not condense in the cyclone.

A further aspect of the invention is that the upper limit of the temperature of the cyclone is determined by the need to prevent the oxidation of carbon in the cyclone. This will depend on several factors including the carbon content of the material collected in the cyclone, the oxygen potential of the gas, determined by its $CO_2$ and oxygen concentration, the reactivity of the carbon in the gas and the residence time of particles and gas in the cyclone. In typical operation with a waste of the composition and characteristics in Table 1 we have found that cyclone temperatures from 400 to 600° C. are satisfactory and preferably from 450 to 550° C. to ensure negligible carbon oxidation. However, it should be emphasised that the present invention is not limited to these temperatures due to the related considerations mentioned above.

We have also found that the unreacted chloride vapors can be condensed in an appropriately designed condenser to produce a condensed chloride product substantially free of carbon and rutile. The design conditions for the condenser can be easily determined from the knowledge of the hot gas and vapour compositions and flow rates arriving at the quencher and the temperature which determine the amount of heat to be extracted to cool the gas and the surface area required to achieve efficient condensation.

As a further aspect of our invention it is possible to treat this condensed product which is substantially chloride either by recirculating it to the fluidised bed reactor or by treating it with oxygen in a separate reactor to increase the recovery of chlorine.

Our invention therefore relates to the novel processing steps which maximize the recovery of chlorine, minimize the conversion of carbon, and separate the unconverted carbon and rutile and other inert materials from the waste in an appropriately designed cyclone.

Figure 6:
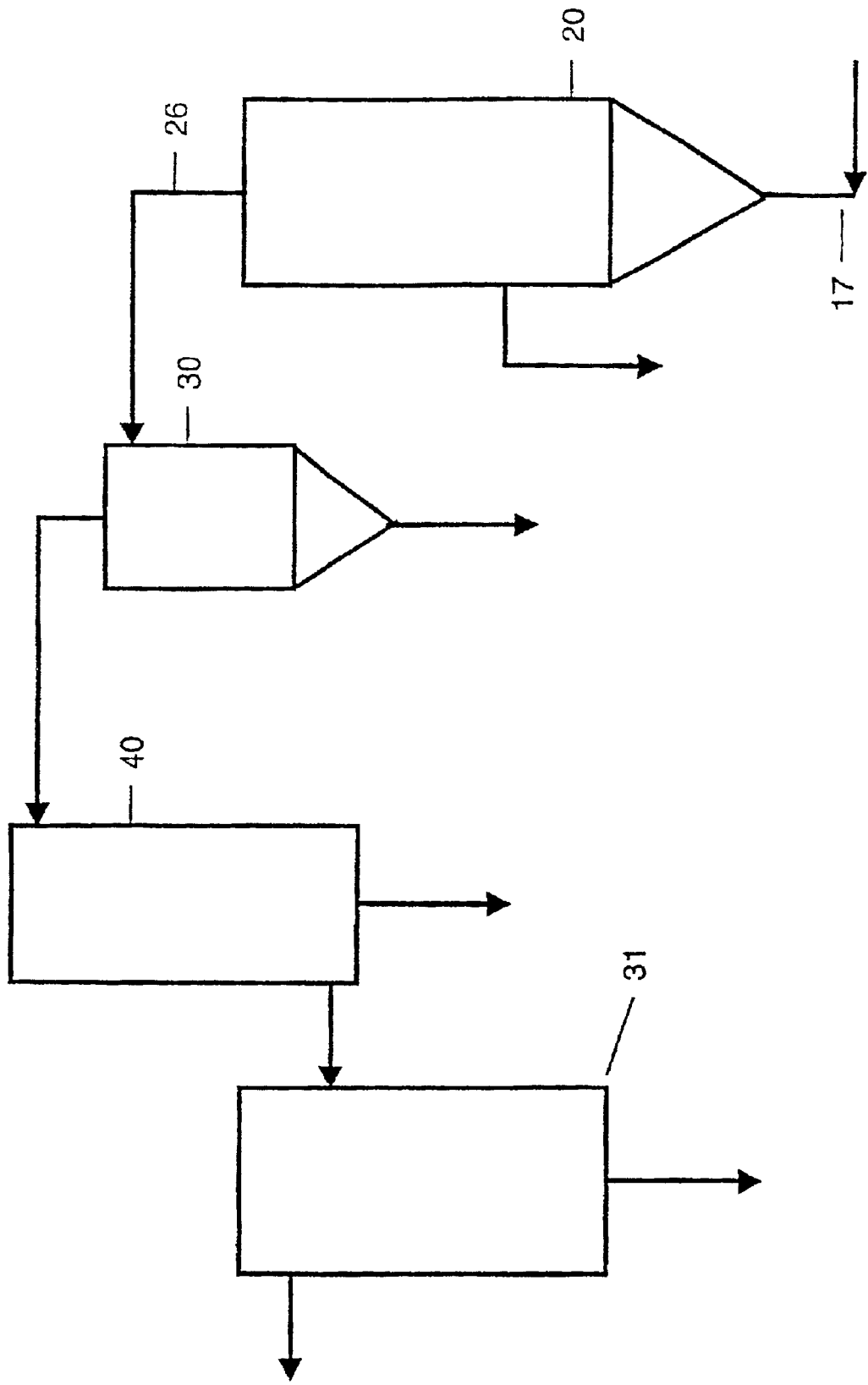
FIG. 6 is a schematic diagram of the overall process.

The overall process is illustrated in the flow chart given in FIG. 6. The process comprises feeding chlorinator waste with a gas containing oxygen to the fluidised bed dechlorinator 20 in which the conditions of temperature, gas velocity and oxygen to feed stoichiometry are controlled in an appropriate manner to optimise the recovery of chlorine and minimize the conversion of carbon. This dechlorination step essentially separates the chlorine from the chloride coating associated with carbon and rutile particles contained in the chlorinator waste. A chlorine rich vapour stream leaves the dechlorinator and is passed to a cyclone 30 in which any particles of carbon and rutile which leave the dechlorination reactor (having been stripped of chlorine in the reactor) are separated from the gas stream. The cyclone is maintained at a temperature above the condensation temperature of any unreacted chlorides so that an effective separation is achieved between the solids and the unreacted chloride vapors. Any unreacted chloride vapors remain in the chlorine-rich gas stream and are conveyed to the quencher 40. In the quencher any unreacted chlorides are condensed but the chlorine gas stream passes through the quencher to a baghouse or other appropriate separation device 31 to remove any residual fine dust particles so as to obtain a clean gas. The quencher condenses chlorides, which are substantially free of carbon, rutile and other solids and may be recirculated to the dechlorination reactor or may be reacted separately with oxygen to recover the residual chlorine. Thus, the process offers a practical means of increasing the chlorine recovery.

Throughout this specification and the claims, the words "comprise" "comprises" and "comprising" are used in a non-exclusive sense.

Modifications to the process for chlorine recovery described above apparent to the person skilled in the art and within the spirit and scope of the present invention are encompassed by the above description.

What is claimed is:

1. A process for recovering chlorine from chlorinator waste comprising the steps of:

forming a single fluidized bed of chlorinator waste, wherein said chlorinator waste comprises a mixture of metal chlorides and carbon in a fluidizing gas containing oxygen; and treating said chlorinator waste with oxygen in a single stage under conditions that promote conversion of said metal chlorides into metal oxides and chlorine gas, and discourage oxidation of said carbon contained in said chlorinator waste, wherein said conditions are obtained by controlling the superficial velocity of the fluidizing gas, the proportion of oxygen in the gas fed to the fluidized bed, oxygen to chlorinator waste feed ratio, temperature within the fluidized bed, either separately or in combination.

2. A process according to claim 1, wherein the temperature of the fluidized bed is maintained in a range from 400 to 700° C.

3. A process according to claim 1, wherein the superficial velocity of the gas is maintained in a range from 0.2 to 1 meter/second.

4. A process according to claim 1, wherein the stoichiometric ratio, R, is maintained in a range from 0.21 to 1.2.

5. A process according to claim 1, wherein the temperature of the fluidized bed is maintained in a range from 550 to 650° C.

6. A process for recovering chlorine from a mixture containing metal chlorides and carbon, the process comprising:

forming a single fluidized bed of the mixture in a fluidizing gas containing oxygen; and converting the mixture in a single stage under conditions that promote conversion of metal chlorides to metal oxides and chlorine gas, and discourage oxidation of carbon, wherein the conditions which promote conversion of metal chlorides into metal oxides and discourage oxidation of carbon contained in the waste are obtained by controlling the superficial velocity of the fluidizing gas, the proportion of oxygen in the gas fed to the fluidized bed, oxygen to chlorinator waste feed ratio, temperature within the fluidized bed, either separately or in combination.

7. A process for recovering chlorine from chlorinator waste comprising the steps of:

forming a single fluidized bed of chlorinator waste, wherein said chlorinator waste comprises a mixture of metal chlorides and carbon in a fluidizing gas containing oxygen; and treating said chlorinator waste with oxygen in a single stage under conditions that promote conversion of said metal chlorides into metal oxides and chlorine gas, and discourage oxidation of said carbon contained in said chlorinator waste.

* * * * *

UNITED STATES PATENT AND TRADEMARK OFFICE
CERTIFICATE OF CORRECTION

PATENT NO. : 6,770,255 B1
DATED : August 3, 2004
INVENTOR(S) : Rajakumar et al.

It is certified that error appears in the above-identified patent and that said Letters Patent is hereby corrected as shown below:

Title page,
Item [73], Assignee, "The Commonwealth of Australia Commonwealth Scientific and Industrial Research Organization," should read -- Commonwealth Scientific and Industrial Research Organisation, --.

Column 1,
Lines 52-53, "synthetic Futile by" should read -- synthetic rutile by --

Column 5,
Line 52, "is in, the range 0.2" should read -- is in the range 0.2 --

Column 6,
Line 7, "The reactor," should read -- The reactor --
Line 61, "image of (a)a" should read -- image of (a) a --

Column 11,
Line 66, ""comprise" "comprises" and" should read -- "comprise", "comprises" and --

Signed and Sealed this

Nineteenth Day of April, 2005

JON W. DUDAS
*Director of the United States Patent and Trademark Office*